(12) United States Patent
Rodgers et al.

(10) Patent No.: US 11,470,163 B2
(45) Date of Patent: Oct. 11, 2022

(54) MULTI-WORKSPACE SHARED COMMUNICATION CHANNEL

(71) Applicant: Slack Technologies, Inc., San Francisco, CA (US)

(72) Inventors: John Rodgers, Vancouver (CA); James Scheinblum, Oakland, CA (US); Tracy Stampfli, San Francisco, CA (US); Michael Demmer, San Francisco, CA (US); Danil Glinenko, Vancouver (CA); Jason Klym, San Francisco, CA (US)

(73) Assignee: Slack Technologies, LLC, San Francisco, CA (US)

( * ) Notice: Subject to any disclaimer, the term of this patent is extended or adjusted under 35 U.S.C. 154(b) by 0 days.

(21) Appl. No.: 17/126,985

(22) Filed: Dec. 18, 2020

(65) Prior Publication Data

US 2021/0360073 A1 Nov. 18, 2021

Related U.S. Application Data

(63) Continuation of application No. 16/877,270, filed on May 18, 2020.

(51) Int. Cl.
*H04L 67/148* (2022.01)
*H04L 67/306* (2022.01)
(Continued)

(52) U.S. Cl.
CPC .......... *H04L 67/148* (2013.01); *H04L 67/306* (2013.01); *H04L 67/535* (2022.05); *H04L 67/55* (2022.05)

(58) Field of Classification Search
None
See application file for complete search history.

(56) References Cited

U.S. PATENT DOCUMENTS 8,214,747 B1 * 7/2012 Yankovich ............ G06F 9/4451
715/751
8,892,679 B1 11/2014 Destagnol et al.
(Continued)

OTHER PUBLICATIONS

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

*Primary Examiner* — James A Edwards
(74) *Attorney, Agent, or Firm* — Lee & Hayes, P.C.

(57) ABSTRACT

Multi-workspace shared communication channels described. A communication channel of a group-based communication platform can be associated with multiple group identifiers to associate the communication channel with at least two workspaces, wherein a first group identifier corresponds to a first workspace within which a first group communicates and a second group identifier corresponds to a second workspace within which a second group. The communication channel can be associated with multiple organization identifiers to associate the communication channel with at least two organizations, wherein a first organization identifier corresponds to a first organization and a second organization identifier corresponds to a second organization. A user interface can be presented via a user computing device, wherein the user interface includes an indication of the communication channel, and wherein the indication is associated with a graphical element indicating that the communication channel is associated with multiple organizations.

20 Claims, 9 Drawing Sheets

(51) Int. Cl.
　　　*H04L 67/55*　　　(2022.01)
　　　*H04L 67/50*　　　(2022.01)

(56) References Cited

U.S. PATENT DOCUMENTS

| | | | |
|---|---|---|---|
| 9,395,893 | B1 | 7/2016 | Beausoleil et al. |
| 10,645,088 | B1 | 5/2020 | Yanes et al. |
| 2007/0255712 | A1 | 11/2007 | Mahoney et al. |
| 2007/0283278 | A1* | 12/2007 | Hupfer .................. G06F 3/00 715/751 |
| 2009/0055483 | A1 | 2/2009 | Madan et al. |
| 2015/0378581 | A1* | 12/2015 | Dietz .................. G06F 3/0488 715/769 |
| 2016/0342665 | A1 | 11/2016 | Lane et al. |
| 2018/0287982 | A1 | 10/2018 | Draeger et al. |
| 2019/0098087 | A1* | 3/2019 | Johnston .............. G06Q 10/107 |
| 2019/0278616 | A1 | 9/2019 | Momchilov et al. |
| 2020/0064997 | A1* | 2/2020 | Lewbel .............. G06F 3/04883 |
| 2020/0177705 | A1 | 6/2020 | Rossman et al. |
| 2020/0236224 | A1 | 7/2020 | Harbinson et al. |
| 2021/0360072 | A1 | 11/2021 | Rodgers et al. |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.
"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.
Robert Hof, "Stewart Butterfield On How Slack Became A $2.8 Billion Unicorn", FORBES, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.
Matthew Ingram, "Flickr co-founder launches Slack, an all-in-one messaging tool designed to kill email forever", Gigaom, LexisNexis, https://advance.lexis.com/api/permalink/0b676b7c-aec3-4560-861e-d030d1dd008c/?context=1000516, (dated Feb. 12, 2014, 7:03 PM), 3 pages.
Internet Relay Chat, Wikipedia, [online][retrieved May 30, 2019], Retrieved from the Internet: <URL: https://en.wikipedia.org/wiki/Internet_Relay_Chat> (dated May 28, 2019) 21 pages.
Mike Issac, "Slack, a Start-Up With an App to Foster Business Collaboration, Is Valued at $1.1 Billion", The New York Times Blogs (BITS), LexisNexis, https://advance.lexis.com/api/permalink/3eb84b34-a8f9Md7d-9573-89d9598a4963/?context=1000516>. (dated Oct. 31, 2014) 3 pages.
Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016)6 pages.
Matsumoto, T. et al., "Chocoa Communicator—A New Communication System Based on Awareness and Text Communications", FUJITSU Sci. Tech. J., 36, 2, (Dec. 2000) pp. 154-161.
Oikarinen, J. & Reed, D., "Internet Relay Chat Protocol", Request for Comments: 1459, Network Working Group, [online][retrieved May 30, 2019], Retrieved from the Internet: <URL: https://www.rfc-editor.org/rfc/rfc1459.txt>. (dated May 1993) 57 pages.
Ernie Smith, "Picking Up The Slack", TEDIUM, [online][retrieved May 9, 2019]. Retrieved from the Internet: <URL: https://tedium.co/2017/10/17/irc-vs-slack-chat-history/>. (dated Oct. 17, 2017) 8 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", GIGAOM, Lexisnexis, https://advance.lexis.com/api/permalink/e83//8c8-09c8-43aa-9ba0-88526283de69/?context=1000516, (dated Aug. 1, 2014, 5:45 PM) 4 pages.
Rebecca Walberg, "Email biggest office waste of time: survey", National Post, At FP10, LexisNexis, https://advance.lexis.com/api/permalink/96268e3f-26ad-48ac-a98f-6c39804ebded/?context=1000516, (dated Mar. 4, 2014) 3 pages.
Office Action for U.S. Appl. No. 16/877,270, dated Oct. 21, 2021, Rodgers, "Integrated Workspaces on Communication Platform", 27 Pages.
Office Action for U.S. Appl. No. 16/877,270, dated May 18, 2021, Rodgers, "Integrated Workspaces on Communication Platform" 27 pages.

* cited by examiner

MULTI-WORKSPACE SHARED COMMUNICATION CHANNEL

RELATED APPLICATIONS

This application claims priority to and is a continuation of U.S. patent application Ser. No. 16/877,270, filed on May 18, 2020, the entire contents of which are incorporated herein by reference.

TECHNICAL FIELD

A communication platform can leverage a network-based computing system to enable users to exchange data. In an example, users of the communication platform can communicate with other users via communication channels (or "channels"). A communication channel, or other virtual space, can be a data route used for exchanging data between and among systems and devices associated with the communication platform. For example, a communication channel may be established between and among various user computing devices, allowing the user computing devices to communicate and share data between and among each other over one or more networks. That is, in some examples, the communication platform can be a channel-based messaging platform and/or hub for facilitating communication between and among users. In some examples, data associated with a communication channel can be presented via a user interface. In some examples, the user interface can present a data feed indicating messages posted to and/or actions taken with respect to a particular communication channel.

Workspaces associated with communication platforms can be hubs where groups of users can communicate and work together. Workspaces are often associated with groups of users that have particular permissions and, as such, users associated with multiple workspaces are not able to access data associated with the multiple workspaces without logging in to each workspace individually.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The figures are not drawn to scale.

DETAILED DESCRIPTION

Figure 1:
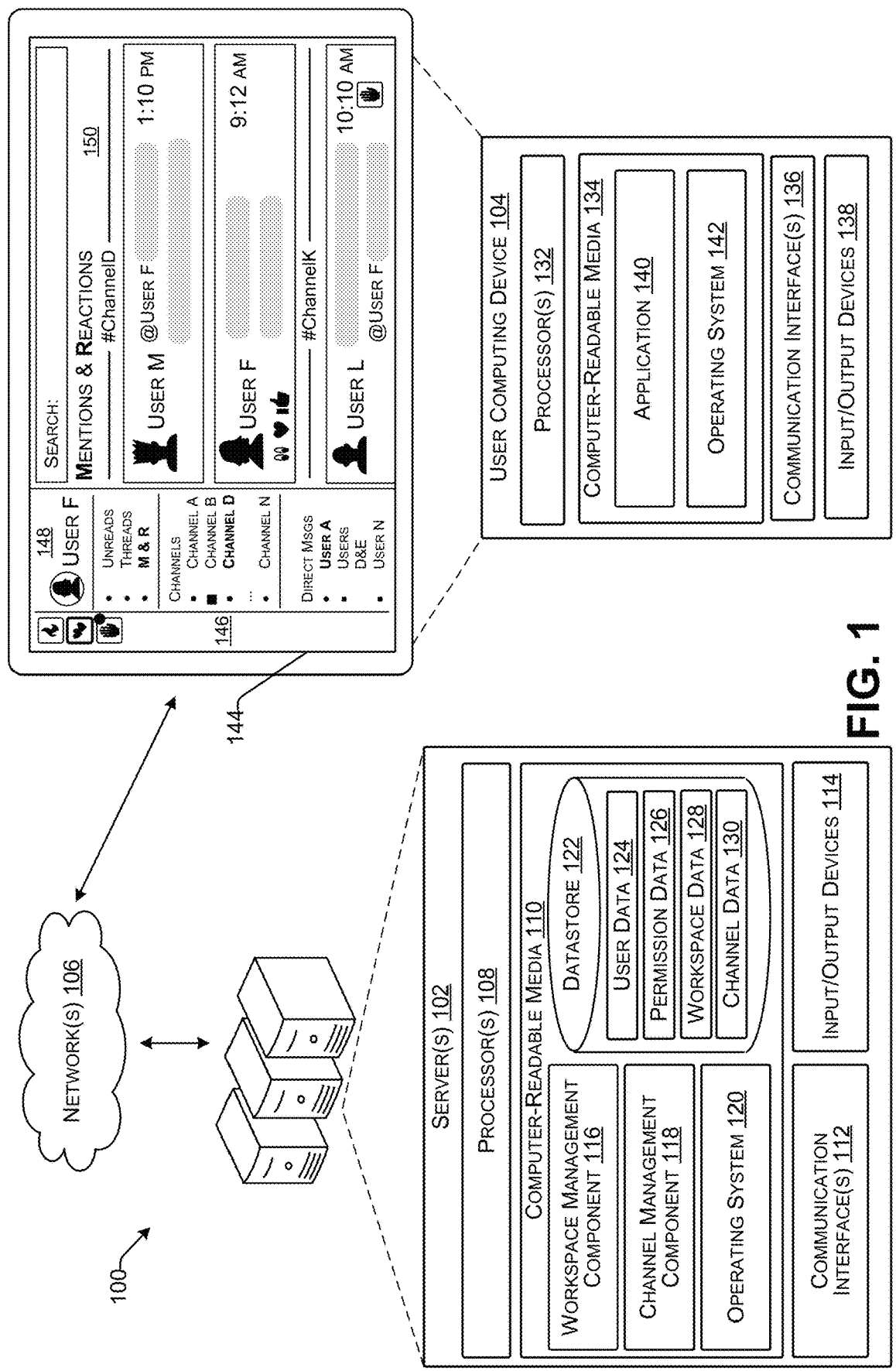
FIG. 1 illustrates an example environment for performing techniques described herein.

Integrated workspaces on a communication platform are described. In an example, a user can utilize communication services available via a communication platform, which, in some examples can be a group-based communication platform, a channel-based messaging platform and/or any other platform for facilitating communication between and among users. In at least one example, the communication platform can be associated with multiple workspaces. A workspace can be a hub where users (e.g., team members, group members, department members, employees, etc.) associated with a same group identifier (e.g., entity name, department, division, office, domain, etc.) can communicate and work together. That is, a workspace can be a container that stores and/or manages data associated with a group. In at least one example, a workspace can comprise communication channels (or "channels") where users of the group can exchange communications. In some examples, the workspace can be associated with a set of permissions that are particular to the workspace, communication channels associated with the workspace (some of which may be specific to the workspace and some of which may be shared with other groups), data associated with the workspace, and the like. Techniques described herein are directed to enabling users associated with multiple workspaces to access data associated with the multiple workspaces and/or otherwise communicate with users associated with the multiple workspaces via a user interface that integrates data from multiple workspaces, without logging in to each workspace individually. That is, techniques described herein are directed to integrating workspaces on a communication platform, via a user interface configured to present data from multiple workspaces, to enable users to access data associated with multiple workspaces and/or otherwise communicate with other users associated with the multiple workspaces via streamlined, more user-friendly user interfaces and operations.

In an example, the communication platform can utilize user accounts, which can be associated with one or more user identifiers, to manage data associated with users of the communication platform. Furthermore, the communication platform can utilize group identifiers to manage data associated with groups of users. As described above, a group identifier can be associated with a workspace. That is, each workspace can be associated with a group identifier and users associated with the same group identifier can use the workspace for communicating and/or working with other users of the group. In an example, the communication platform (e.g., computing device(s) associated therewith) can associate a user account of a user with at least two group identifiers thereby associating the user account (and thereby, user) with at least two workspaces. A first group identifier can correspond to a first workspace within which a first group communicates via a communication platform and a second group identifier can correspond to a second workspace within which a second group communicates via the communication platform. In at least one example, the communication platform can cause a user interface to be presented via a user computing device operable by the user, wherein the user interface presents data associated with each of the at least two workspaces with which the user is associated. As such, in at least one example the user can interact with the user interface to access the data associated each of the at least two workspaces, interact with such data, and/or otherwise communicate with other users associated with each of the at least two workspaces.

In some examples, the communication platform can detect an event associated with the first workspace or the second workspace. In at least one example, an event can be associated with an action taken with respect to a communication channel associated with at least one of the first workspace or the second workspace. For example, such an event and/or action can include, but is not limited to, a message posted to a communication channel, a comment in a thread associated with a message in a communication channel, a mention of the user associated with a communication channel, a reaction associated with a message in a communication channel, a draft of a message to be posted in a communication channel, a file uploaded to a communication channel, an item saved to a communication channel, or the like. In some examples, events and/or actions can include adding, deleting, or modifying data associated with a communication channel and/or workspace. Based at least in part on detecting the event, the communication platform can update the user interface. In at least one example, the updated user interface can be accessible via the first workspace and the second workspace. In some examples, events associated with different workspaces with which the user is associated can be presented via an integrated feed associated with the user interface. Detected events can be updated in the user interface, for example, in real time or near-real time. As such, techniques described herein enable the user to access data associated with multiple workspaces, interact with such data, and/or otherwise communicate with other users associated with the multiple workspaces via the user interface, without needing to log in and out of different workspaces.

As described above, workspaces are often associated with groups of users that have particular permissions and as such, in existing techniques, users associated with multiple workspaces are not able to access data associated with the multiple workspaces without logging in to each workspace individually. That is, in existing techniques, for a user to access data associated with a workspace, the user must log in to that workspace. In existing techniques, if a user is logged into a first workspace and receives a message in a second workspace, the user will not know of the message until the user logs out of the first workspace and into the second workspace. That is, in existing techniques, even though a user can be using a same communication platform the user may not be aware of events that affect the user that are occurring in workspaces to which the user is not currently logged in. This can be frustrating for users and can cause a fractured user experience. Further, in existing techniques, for the user to access data associated with another workspace, the user may need to interact with a user computing device multiple times to log out of a current workspace and into another workspace. Not only is this time consuming, such existing techniques are computationally expensive and inefficient. As such, techniques described herein provide solutions to shortcomings in existing techniques. For example, techniques described herein reduce network traffic by reducing the number of login/logout interactions and thereby streamline data associated with multiple workspaces into integrated user interface(s). That is, techniques described herein enable users to access data associated with multiple workspaces, interact with such data, and/or otherwise communicate with other users associated with the multiple workspaces via streamlined, more user-friendly user interfaces and operations.

Additional details are described below with reference to FIGS. 1-9.

FIG. 1 illustrates an example environment 100 for performing techniques described herein. In at least one example, the example environment 100 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other. As described above, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with a same organization. In some examples, members of a group, and thus workspace, can be associated with different organizations (e.g., entities with different organization identifiers).

In at least one example, the example environment 100 can include one or more server computing devices (or "server(s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (TOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a workspace management component 116, a channel management component 118, an operating system 120, and a datastore 122.

In at least one example, the workspace management component 116 can manage workspaces. That is, in at least one example, the communication platform can be partitioned into different workspaces, which can be associated with different groups of users, as described above. As described above, each workspace can be associated with a group identifier and one or more user accounts can be mapped to, or otherwise associated with, the group identifier. User(s) corresponding to such user account(s) can be "members" of the group.

In some examples, the workspace management component 116 can manage workspace membership. That is, the workspace management component 116 can receive requests to associate users with individual workspaces and the workspace management component 116 can associate user accounts associated with such users with group identifiers associated with the individual workspaces. For example, responsive to receiving a request to add a user to a workspace, the workspace management component 116 can associate a user account of the user with a group identifier of the workspace. The workspace management component 116 can disassociate user accounts and group identifiers, for example, when a user is removed from a workspace.

In at least one example, the workspace management component 116 can manage cross-workspace data integration, as described herein. For example, the workspace management component 116 can detect updates to data associated with a workspace and can integrate such updated data into user interface(s) presented via user computing device(s) of user(s) associated with the workspace. Such data integration can be "cross-workspace" such that, regardless of which workspace a user is logged in to, the user can receive updated data associated with each of the workspaces of which he or she is a member and/or access data associated with each of the workspaces of which he or she is a member (pending permissions, as described below). That is, the workspace management component 116 can detect updates to data associated with a workspace and can integrate such updated data into user interface(s) presented via user computing device(s) of user(s) associated with the workspace. Similarly, the workspace management component 116 can facilitate cross-workspace operations. For example, the workspace management component 116 can facilitate messages between workspaces, searches between or across multiple workspaces, and the like. Additional details of operations that can be performed by the workspace management component 116 are described below.

In at least one example, the channel management component 118 can manage communication channels. As described above, in at least one example, the communication platform can be a channel-based messaging platform, that in some examples, can be usable by group(s) of users. Users of the communication platform can communicate with other users via communication channels. A communication channel, or virtual space, can be a data route used for exchanging data between and among systems and devices associated with the communication platform. In at least one example, the channel management component 118 can establish a communication channel between and among various user computing devices, allowing the user computing devices to communicate and share data between and among each other. In at least one example, the channel management component 118 can manage such communications and/or sharing of data. In some examples, data associated with a communication channel can be presented via a user interface. In at least one example, the channel management component 118 can interact with the workspace management component 116 to manage the generation, presentation, and/or updating of user interfaces. Additional details of operations that can be performed by the channel management component 118 are described below.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user device 104. The datastore 122 can comprise multiple databases, which can include user data 124, permission data 126, workspace data 128, and channel data 130. Additional or alternative data may be stored in the data store and/or one or more other data stores.

In at least one example, the user data 124 can store data associated with users of the communication platform. In at least one example, the user data 124 can store data in user profiles (which can also be referred to as "user accounts"), which can store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like.

In at least one example, the permission data 126 can store data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, an account or profile associated with the user data 124. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In at least one example, the workspace data 128 can store data associated with individual workspaces. As described above, the communication platform can be partitioned into workspaces associated with groups of users. In at least one example, a group identifier can be associated with a workspace. In at least one example, the group identifier can indicate a physical address in the workspace data 128 where data related to the corresponding workspace is stored. In at least one example, data associated with workspace permissions can be stored in association with the group identifier, data identifying users associated with the workspace can be stored in association with the group identifier, data associated with messages and/or other content associated with the workspace can be stored in association with the group identifier, data associated with communication channels associated with the workspace can be stored in association with the group identifier, and the like. In some examples, workspaces can be associated with one or more organization identifiers, which can be associated with organizations or other entities associated with the communication platform. In some examples, such data can be mapped to, or otherwise associated with, other types of data in the datastore 122 (e.g., the user data 124, the permission data 126, the channel data 130, etc.).

In at least one example, the channel data 130 can store data associated with individual communication channels. In at least one example, the channel management component 118 can establish a communication channel between and among various user computing devices, allowing the user computing devices to communicate and share data between and among each other. In at least one example, a communication channel identification may be assigned to a communication channel, which indicates the physical address in the channel data 130 where data related to that communication channel is stored. A communication channel may be "public," which may allow any user within an organization (e.g., associated with an organization identifier) to join and participate in the data sharing through the communication channel, or a communication channel may be "private," which may restrict data communications in the communication channel to certain users or users having particular roles (e.g., managers, administrators, etc.). In some examples, a communication channel may be "shared," which may allow users associated with different organizations (e.g., entities associated with different organization identifiers) to join and participate in the data sharing through the communication channel. Shared channels may be public such that they are accessible to any user of either organization, or they may be private such that they are restricted to access by certain users or users having particular roles from both organizations.

In some examples, the datastore 122 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, individual organizations can be associated with a database shard within the datastore 122 that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared channel).

In some examples, individual groups can be associated with a database shard within the datastore 122 that stores data related to a particular group identification (e.g., workspace). For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a communication channel can be associated with a database shard within the datastore 122 that stores data related to a particular channel identification. For example, a database shard may store electronic communication data associated with the communication channel, which enables members of that particular communication channel to communicate and exchange data with other members of the same communication channel in real time or near-real time. In this example, a group or organization can be the owner of the database shard and can control where and how the related data is stored.

In some examples, individual users can be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Web sockets, Application Programming Interfaces (APIs) (e.g., using API calls), HyperText Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 132, computer-readable media 134, one or more communication interfaces 136, and input/output devices 138.

In at least one example, each processor of the processor(s) 132 can be a single processing unit or multiple processing units, and can include single or multiple computing units or multiple processing cores. The processor(s) 132 can comprise any of the types of processors described above with reference to the processor(s) 108 and may be the same as or different than the processor(s) 108.

The computer-readable media 134 can comprise any of the types of computer-readable media 134 described above with reference to the computer-readable media 110 and may be the same as or different than the computer-readable media 110. Functional components stored in the computer-readable media can optionally include at least one application 140 and an operating system 142.

In at least one example, the application 140 can be a mobile application, a web application, or a desktop application, which can be provided by the communication platform or which can be an otherwise dedicated application. In some examples, individual user computing devices associated with the environment 100 can have an instance or versioned instance of the application 140, which can be downloaded from an application store, accessible via the Internet, or otherwise executable by the processor(s) 132 to perform operations as described herein. That is, the application 140 can be an access point, enabling the user computing device 104 to interact with the server(s) 102 to access and/or use communication services available via the communication platform. In at least one example, the application 140 can facilitate the exchange of data between and among various other user computing devices, for example via the server(s) 102. In at least one example, the application 140 can present user interfaces, as described herein. In at least one example, a user can interact with the user interfaces via touch input, keyboard input, mouse input, spoken input, or any other type of input.

A non-limiting example of a user interface 144 is shown in FIG. 1. As illustrated in FIG. 1, the user interface 144 can present data associated with one or more communication channels and, in some examples, one or more workspaces. That is, in some examples, the user interface can integrate data from multiple workspaces into a single user interface so that the user (e.g., of the user computing device 104) can access and/or interact with data associated with the multiple workspaces that he or she is associated with and/or otherwise communicate with other users associated with the multiple workspaces. In some examples, the user interface 144 can include a first region 146, or pane, that includes indicator(s) (e.g., user interface element(s) or object(s)) associated with workspace(s) with which the user (e.g., account of the user) is associated. In some examples, the user interface 144 can include a second region 148, or pane, that includes indicator(s) (e.g., user interface element(s) or object(s)) representing data associated with the workspace(s) with which the user (e.g., account of the user) is associated. Additional details associated with the second region 148 and indicator(s) are described below with reference to FIG. 2.

In at least one example, the user interface 144 can include a third region 150, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the third region 150 can be associated with the same or different workspaces. That is, in some examples, the third region 150 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the third region 150 presents data associated with multiple workspaces, at least some data can be associated with an indication of which workspace the data is associated with. Additional details associated with the user interface 144, and the third region 150, are described below with reference to FIG. 2.

In at least one example, the operating system 142 can manage the processor(s) 132, computer-readable media 134, hardware, software, etc. of the server(s) 102.

The communication interface(s) 136 can include one or more interfaces and hardware components for enabling communication with various other devices (e.g., the user computing device 104), such as over the network(s) 106 or directly. In some examples, the communication interface(s) 136 can facilitate communication via Websockets, APIs (e.g., using API calls), HTTPs, etc.

The user computing device 104 can further be equipped with various input/output devices 138 (e.g., I/O devices). Such I/O devices 138 can include a display, various user interface controls (e.g., buttons, joystick, keyboard, mouse, touch screen, etc.), audio speakers, connection ports and so forth.

While techniques described herein are described as being performed by the workspace management component 116, the channel management component 118, and the application 140, techniques described herein can be performed by any other component, or combination of components, which can be associated with the server(s) 102, the user computing device 104, or a combination thereof.

Figure 2:
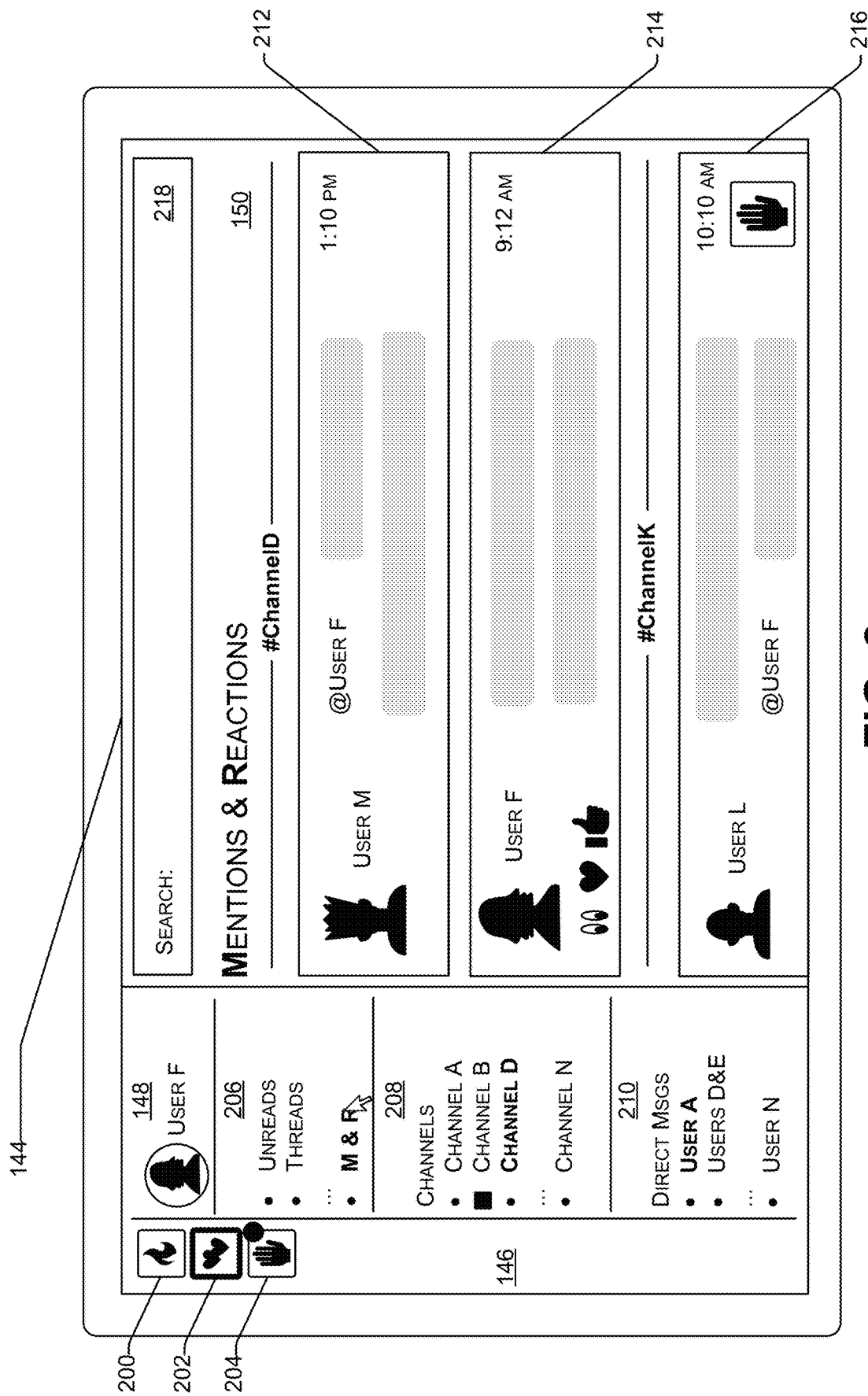
FIG. 2 illustrates an example user interface that presents data that is associated with multiple workspaces, as described herein.

FIG. 2 illustrates additional details associated with the user interface 144 that presents data associated with multiple workspaces, as described above with reference to FIG. 1.

As described above, in at least one example, the user interface 144 can include a first region 146, or pane, that includes indicator(s) (e.g., user interface element(s) or object(s)) of workspace(s) with which the user (e.g., account of the user) is associated. As illustrated in FIG. 2, the user (e.g., User F) can be associated with three different workspaces. In some examples, the workspaces can be associated with a same organization (e.g., associated with a same organization identifier). In some examples, one or more of the workspaces can be associated with different organizations (e.g., associated with different organization identifiers). In some examples, one of the workspaces can be associated with users from a single organization (e.g., associated with a same organization identifier) and another of the workspaces can be associated with users from two or more different organizations (e.g., associated with different organization identifiers).

In at least one example, each workspace can be associated with a different indicator 200-204, presented via the first region 146. In at least one example, a user account of the user (e.g., User F) can be associated with group identifiers that correspond to each of the workspaces (e.g., as determined by the user data 124 and/or the workspace data 128). As such, the user account of the user can be associated with each of the workspaces. A first indicator 200 can represent a first workspace, a second indicator 202 can represent a second workspace, and a third indicator 204 can represent a third workspace.

In some examples, the user can navigate between the workspaces by actuating a control associated with each of the indicators 200-204 without needing to log out of one workspace and log in to each of the other workspaces. Non-limiting examples of such indicators, or any indictors described herein, can include icons, symbols, links, tabs, or other user interface elements or objects. In some examples, such indicators can be associated with actuation mechanisms to enable a user to select an indicator and transition to another workspace. In some examples, a visual indicator can indicate which workspace a user is currently interacting with and/or most recently interacted with. For example, the second indicator 202 is outlined in a heavier weight than the first indicator 200 and the third indicator 204, thereby indicating which workspace the user is currently interacting with and/or most recently interacted with. In some examples, the indicators 200-204 can be associated with another indicator indicating that the corresponding workspace has been updated. An example is shown with respect to the third indicator 204.

While three indicators 200-204 are illustrated in FIG. 2, the user can be associated with any number of workspaces. In some examples, indicators associated with all of the workspaces with which a user is associated can be presented via the first region 146. In some examples, some of the indicators associated with all of the workspaces with which a user is associated can be presented via the first region 146 and the user can interact with the user interface 144 to view additional or alternative indicators. In examples where fewer than all workspaces are represented via the user interface 144, the indicators can be arranged in alphabetical order, in an order of most recent interaction, in an order based on most frequent interaction, or some other order.

In some examples, the first region 146 may not be included in the user interface 144, and such information can be integrated into the user interface 144 via additional or alternative mechanisms.

In some examples, the user interface 144 can include a second region 148, or pane, that includes indicator(s) (e.g., user interface element(s) or object(s)) representing virtual space(s) associated with the workspace(s) with which the user (e.g., account of the user) is associated. In at least one example, the second region 148 can include one or more sub-sections, or sub-panes, which can represent different virtual spaces. For example, a first sub-section 206 can include indicators representing virtual spaces that can aggregate data associated with a plurality of communication channels and/or workspaces. In at least one example, each virtual space can be associated with an indicator in the first sub-section 206. In some examples, an indicator can be associated with an actuation mechanism such that when actuated, can cause the application 140 to present data associated with the corresponding virtual space via the third region 150. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the third region 150, for example in a feed. In such examples, different types of events and/or actions, which can be associated with different communication channels and/or virtual spaces, can be presented via a same feed. In some examples, such data can be organized and/or is sortable by workspace, time, type of action, communication channel, user, or the like. In some examples, such data can be associated with an indication of which user (e.g., member of the communication channel) posted the message and/or performed an action.

In some examples, each virtual space can be associated with a same type of event and/or action. For example, "threads" can be associated with messages, files, etc. posted in threads to messages posted in a communication channel and "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user. That is, in some examples, same types of events and/or actions, which can be associated with different communication channels and/or virtual spaces, can be presented via a same feed. As with the "unreads" virtual space, data associated with such virtual spaces can be organized and/or is sortable by workspace, time, type of action, communication channel, user, or the like.

In at least one example, the second region 148 of the user interface 144 can include a second sub-section 208, or sub-pane, that includes indicators representing communication channels. In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces, or may only be associated with one of the workspaces. In some examples, the communication channels represented can be associated with combinations of communication channels associated with a single workspace and communication channels associated with different workspaces.

In some examples, the second sub-section 208 can depict all communication channels, or a subset of all communication channels, that the user has permission to access (e.g., as determined by the permission data 126). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the second sub-section 208 can depict all communication channels, or a subset of all communication channels, that the user is a member of, and the user can interact with the user interface 144 to browse or view other communication channels that the user is not a member of but are not currently displayed in the second sub-section 208. In some examples, different types of communication channels (e.g., public, private, shared, cross-workspace, etc.) can be in different sections of the second sub-section 208, or can have their own sub-regions or sub-panes in the user interface 144. In some examples, communication channels associated with different workspaces can be in different sections of the second sub-section 208, or can have their own regions or panes in the user interface 144.

In some examples, the indicators can be associated with graphical elements that visually differentiate types of communication channels. For example, Channel B is associated with a square visual element instead of a circle visual element. As a non-limiting example, and for the purpose of this discussion, the square visual element can indicate that the user is not a current member of Channel B, whereas the circle visual element can indicate that the user is a current member of Channels A, D, and N. In some examples, additional or alternative graphical elements can be used to differentiate between public communication channels, private communication channels, shared communication channels, communication channels associated with different workspaces, and the like. In other examples, communication channels that the user is not a current member of may not be displayed in the second sub-section 208 of the user interface 144. In such examples, the user may navigate to a different interface (not shown) to browse additional channels that are accessible to the user but to which the user is not currently a member.

In addition to the second sub-section 208, the second region 148 can include a third sub-section 210, or sub-pane, that can include indicators representative of communications with individual users or multiple specified users (e.g., instead of all, or a subset of, members of an organization). Such communications can be referred to as "direct messages." That is, the third sub-section 210, or sub-pane, can include indicators representative of virtual spaces that are associated with private messages between one or more users.

As described above, in at least one example, the user interface 144 can include a third region 150, or pane, that is associated with a feed indicating messages posted to and/or actions taken with respect to a communication channel and/or other virtual space (e.g., a virtual space associated with direct message communication(s), a virtual space associated with event(s) and/or action(s), etc.) for facilitating communications. As described above, in at least one example, data associated with the third region 150 can be associated with the same or different workspaces. That is, in some examples, the third region 150 can present data associated with the same or different workspaces via an integrated feed. In some examples, the data can be organized and/or is sortable by workspace, time, type of action, communication channel, user, or the like. In some examples, such data can be associated with an indication of which user posted the message and/or performed an action. In examples where the third region 150 presents data associated with multiple workspaces, at least some data can be associated with an indication of which workspace the data is associated with.

For example, in FIG. 2, the user (e.g., User F), can interact with the user interface 144 to view data associated with the virtual space corresponding to "mentions and reactions." In FIG. 2, data associated with the virtual space can be associated with different communication channels and different workspaces. As illustrated, the data is organized by communication channel (e.g., #ChannelD and #ChannelK). However, as described above, the data can be organized and/or sortable by workspace, time, type of action, user, or the like. As illustrated, another user (e.g., User M) mentioned the user (e.g., User F) in a message, represented by the indicator 212 (e.g., a user interface element, object, etc.), which is associated with a communication channel (e.g., #ChannelD). The user (e.g., User F) also posted a message, represented by the indicator 214 (e.g., a user interface element, object, etc.), in the same communication channel. One or more other users reacted to the message, represented by the indicator 214, with an emoji. As such, indicators associated with both messages can be presented in the third region 150. Because the data is organized by communication channel, indicators associated with both messages are presented together. In at least one example, the communication channel (e.g., #ChannelD) can be associated with the second workspace (e.g., associated with the second indicator 202). In some examples, because the user is currently interacting with (or most recently interacted with) the second workspace, neither of the indicators 212 or 214 are associated with workspace indicators (e.g., the second indicator 202).

As illustrated, another user (e.g., User L) mentioned the user (e.g., User F) in a message, represented by the indicator 216 (e.g., a user interface element or object), which is associated with a communication channel (e.g., #ChannelK). As such, the indicator 216 can be presented in the third region 150. Because the data is organized by communication channel, the indicator 216 can be presented in a different position in the feed than the other indicators 212 and 214. In at least one example, the communication channel (e.g., #ChannelK) can be associated with the third workspace (e.g., associated with the third indicator 204). In some examples, because the user is currently interacting with (or most recently interacted with) the second workspace, the indicator 216 may include an indicator indicating that it is associated with the third workspace (e.g., the third indicator 204).

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

In some examples, a user can comment on a message in a "thread." A thread can be a message associated with another message that is not posted to a communication channel, but instead is maintained within an object associated with the original message. Messages and/or threads can be associated with file(s), emoji(s), app(s), etc.

A communication channel or other virtual space can be associated with data and/or content other than messages, or data and/or content that is associated with messages. For example, non-limiting examples of additional data that can be presented via the third region 150 of the user interface 144 include members added to and/or removed from the communication channel, file(s) (e.g., file attachment(s)) uploaded and/or removed from the communication channel, application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

In some examples, the third region 150 can comprise a feed associated with a single communication channel. In such examples, data associated with the communication channel can be presented via the feed. In at least one example, data associated with a communication channel can be viewable to at least some of the users of a group of users associated with a same group identifier. In some examples, for members of a communication channel, the content of the communication channel (e.g., messaging communications) can be displayed to each member of the communication channel. For instance, a common set of group-based messaging communications can be displayed to each member of the communication channel such that the content of the communication channel (e.g., messaging communications) may not vary per member of the communication channel. In some examples, data associated with a communication channel can appear differently for different users (e.g., based on personal configurations, group membership, etc.).

In at least one example, the format of the individual communication channels or virtual spaces may appear differently to different users. In some examples, the format of the individual communication channels or virtual spaces may appear differently based on which workspace a user is currently interacting with or most recently interacted with. In some examples, the format of the individual communication channels or virtual spaces may appear differently for different users (e.g., based on personal configurations, group membership, etc.).

In at least one example, the user interface 144 can include a search mechanism 218, wherein a user can input a search term and the server(s) 102 can perform a search associated with the communication platform. In some examples, the search can be performed across each workspace with which the user is associated, or the search can be restricted to a particular workspace, based on a user specification.

The user interface 144 is a non-limiting example of a user interface that can be presented via the user computing device 104 (e.g., by the application 140). In some examples, the application 140 can receive data from the workspace management component 116 and/or channel management component 118 and the application 140 can generate and present the user interface 144 based on the data. In other examples, the application 140 can receive data from the channel management component 118 and instructions for generating the user interface 144 from the workspace management component 116 and/or channel management component 118. In such an example, the application 140 can present the user interface 144 based on the instructions. Additional or alternative data can be presented via a user interface and additional or alternative configurations can be imagined.

Figure 3:
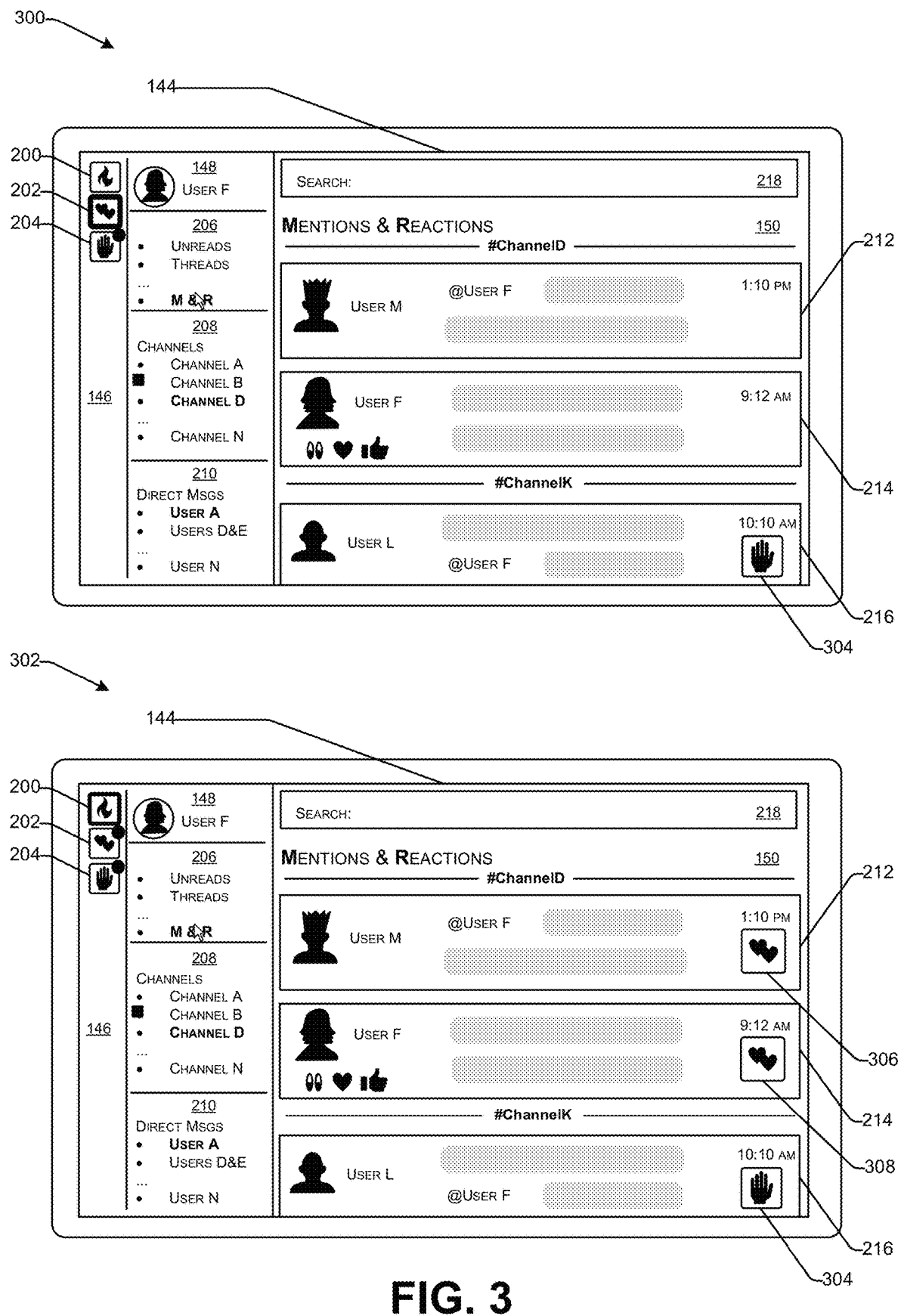
FIG. 3 illustrates an example user interface, accessible via different workspaces, that presents data associated with different workspaces, as described herein.

FIG. 3 illustrates two instances of the user interface 144 which are being presented in association with different workspaces. That is, the user interface 144, and data associated therewith, can be accessible from any workspace with which the user is associated. As an example, in FIG. 3, the first instance 300 of the user interface 144 can be presented via the second workspace, which is associated with the second indicator 202, and the second instance 302 can be presented via the first workspace, which is associated with the third indicator 204. For illustrative purposes, in each instance, the corresponding indicator 202 is associated with a heavier weight of a border than the other indicators. As illustrated, the user interface 144 can be accessible by each workspace. In at least one example, the user interface 144 can be substantially identical, without regard to the workspace from which the user is accessing the user interface 144. That is, in at least one example, the configuration and data can be substantially identical.

In some examples, as described above, the user interface 144 can be associated with different indicators (e.g., user elements or objects) to indicate which data is associated with which workspace. For example, in the first instance 300, the user is accessing the user interface 144 from the second workspace. In such an example, data associated with workspaces other than the second workspace can be associated with indicators indicating which workspace the data is associated with. Because the messages associated with the indicators 212 and 214 are associated with the second workspace, neither indicator is associated with such an indicator. However, because the message associated with the indicator 216 is not associated with the second workspace, an indicator 304 indicating that the message is associated with the third workspace is associated with the indicator 216.

In at least one example, if the user interacts with the message associated with the indicator 216, the application 140 can detect such an interaction and can cause the user to transition from the second workspace to the third workspace. For instance, the application 140 can send an indication of such an interaction to the server(s) 102 and the workspace management component 116 can cause the user interface 144 to transition to the third workspace. In such an example, the user interface 144 can present the same or substantially identical data in the same or substantially identical presentation.

In the second instance 302, where the user is accessing the user interface 144 from the first workspace, the messages associated with the indicators 212 and 214 are associated with the second workspace and as such, are associated with indicators 306 and 308, respectively, indicating that they are associated with the second workspace. Further, because the message associated with the indicator 216 is also not associated with the first workspace, an indicator 304 indicating that the message is associated with the third workspace is associated with the indicator 216.

As described above, in at least one example, the user interface 144 can be substantially identical, without regard to the workspace from which the user is accessing the user interface 144. That is, the configuration and data can be substantially identical. In such examples, the sub-sections (e.g., 206, 208, 210) can present the same data in the same order. In some examples, the user interface 144 can vary with respect to configuration or data, depending on which workspace the user is using to access the user interface 144. For instance, in some examples, the sub-sections (e.g., 206, 208, 210) can present different data or the same data in a different order, which can be based on settings or permissions associated with the workspace from which the user is accessing the user interface 144.

Figure 4:
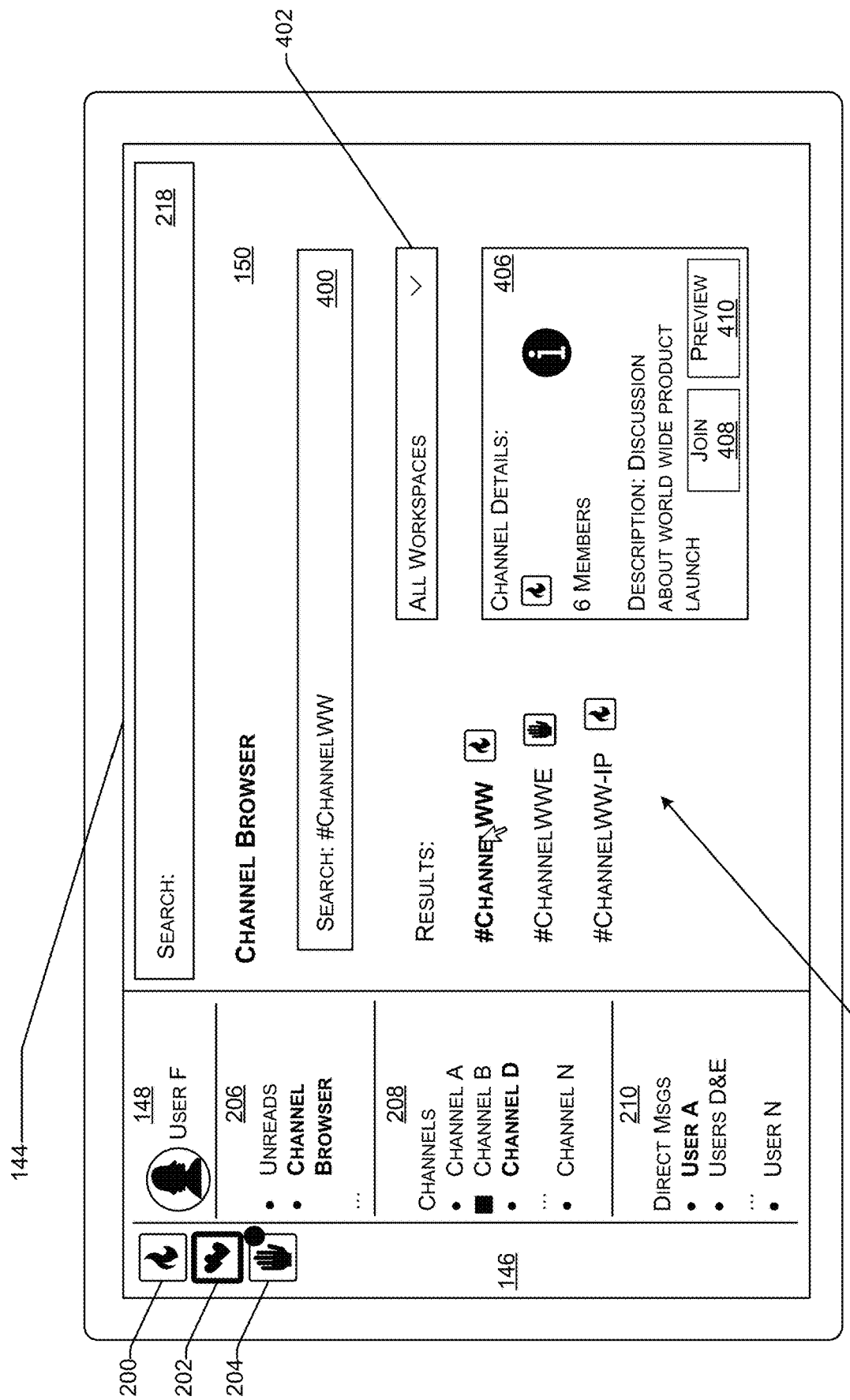
FIG. 4 illustrates an example user interface that presents data associated with multiple workspaces and enables a user to access data from multiple workspaces, as described herein.

FIG. 4 illustrates an example where the user interface 144 presents data associated with multiple workspaces and enables a user to access data from multiple workspaces, for example, via a search. In at least one example, the user interface 144 can include an indicator (e.g., user interface element or object) to enable a user to browse channels. In FIG. 4, such an indicator is shown in association with the first sub-section 206. In at least one example, based at least in part on the user providing an input to the user interface 144 (e.g., actuating a control associated with the indicator), the user can access a virtual space associated with browsing channels of the communication platform via the third region 150. In at least one example, the third region 150 can include a search mechanism 400, wherein a user can input a search term (e.g., a query) associated with a communication channel and the server(s) 102 can perform a search associated with the communication platform. In some examples, the search can be performed across each workspace with which the user is associated, or the search can be restricted to a particular workspace, based on a user specification. In at least one example, the user can interact with an indicator 402 (e.g., a user interface element or object) that enables the user to specify which workspace(s) the server(s) 102 are to search. The indicator 402 is illustrated as a dropdown menu, but additional or alternative mechanisms can be used. In FIG. 4, the user has specified that the server(s) 102 are to perform a search of all workspaces with which the user is associated and/or otherwise has permission to access.

In at least one example, the application 140 can send the input (e.g., the query input into the search mechanism 400 and an indication of the specified workspace(s)) to the server(s) 102. In at least one example, the workspace management component 116 can receive the input and perform a search of data associated with the specified workspace(s). That is, in at least one example, the workspace management component 116 can access the workspace data 128 and/or the channel data 130 to determine whether the any of the communication channels associated with the workspace(s) with which the user is associated (and, in some examples, has specified as part of the search) correspond to the query. If a communication channel associated with the workspace(s) with which the user is associated (and, in some examples, has specified as part of the search) correspond to the query, the workspace management component 116 can return the results to the application 140. In some examples, the workspace management component 116 can access the permission data 126 to determine whether the user has permission to access such communication channels. If the user has permission to access the communication channels associated with the results, the application 140 can cause the results to be presented via the user interface 144. In some examples, the results can be presented as indicators 404 (e.g., user interface elements or objects) within the third region 150.

In at least one example, the user can interact with the user interface 144, for example via actuation of a control associated with an indicator associated with the results, to cause the application 140 to present information associated with a result. For example, channel details associated with the communication channel (e.g., #ChannelWW) can be presented via a sub-section 406, or sub-pane, of the third region 150. In some examples, the channel details can be presented via a pop-up, overlay, or another user interface. In some examples, if a user is not a member of the communication channel, the sub-section 406 can include one or more controls, or other mechanisms, such as a "join" control 408 or "preview" control 410.

In at least one example, based at least in part on the user actuating the "join" control 408, the user account of the user can be associated with the communication channel such that the user is a member of the communication channel (so long as the user has permission to join the communication channel as determined by the permission data 126) and can receive real time or near real-time updates associated with the communication channel. In at least one example, based at least in part on the user actuating the "preview" control 410, the user account of the user can be temporarily associated with the communication channel (so long as the user has permission to preview the communication channel as determined by the permission data 126) such that the user is temporarily subscribed to updates associated with the communication channel and can receive real time or near-real time updates associated with the communication channel. In some examples, the user can "preview" data associated with the communication channel before the user joins the communication channel. In such examples, the user may be able to access/view real time or near-real time updates associated with the communication channel, but the user may not be able to post to the communication channel or interact with data in the communication channel.

FIG. 4 provides but one example of the user interface 144 presenting data associated with multiple workspaces and allowing a user to access data associated with multiple workspaces. In some examples, a user can request to search for a file, a user, a term, a saved item, a message, a draft of a message, an application, or the like (e.g., instead of a channel) that is associated with the workspace(s) with which the user is associated. While the data presented and/or configuration of such data may differ from that presented in FIG. 4, the same or similar techniques can be employed, as described below.

FIGS. 5-9 are flowcharts showing example processes involving techniques as described herein. The processes illustrated in FIGS. 5-9 are described with reference to components described above with reference to the environment 100 shown in FIG. 1 for convenience and ease of understanding. However, the processes illustrated in FIGS. 5-9 are not limited to being performed using the components described above with reference to the environment 100. Moreover, the components described above with reference to the environment 100 are not limited to performing the processes illustrated in FIGS. 5-9.

The processes in FIGS. 5-9 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes in FIGS. 5-9 can be combined in whole or in part with each other or with other processes.

Figure 5:
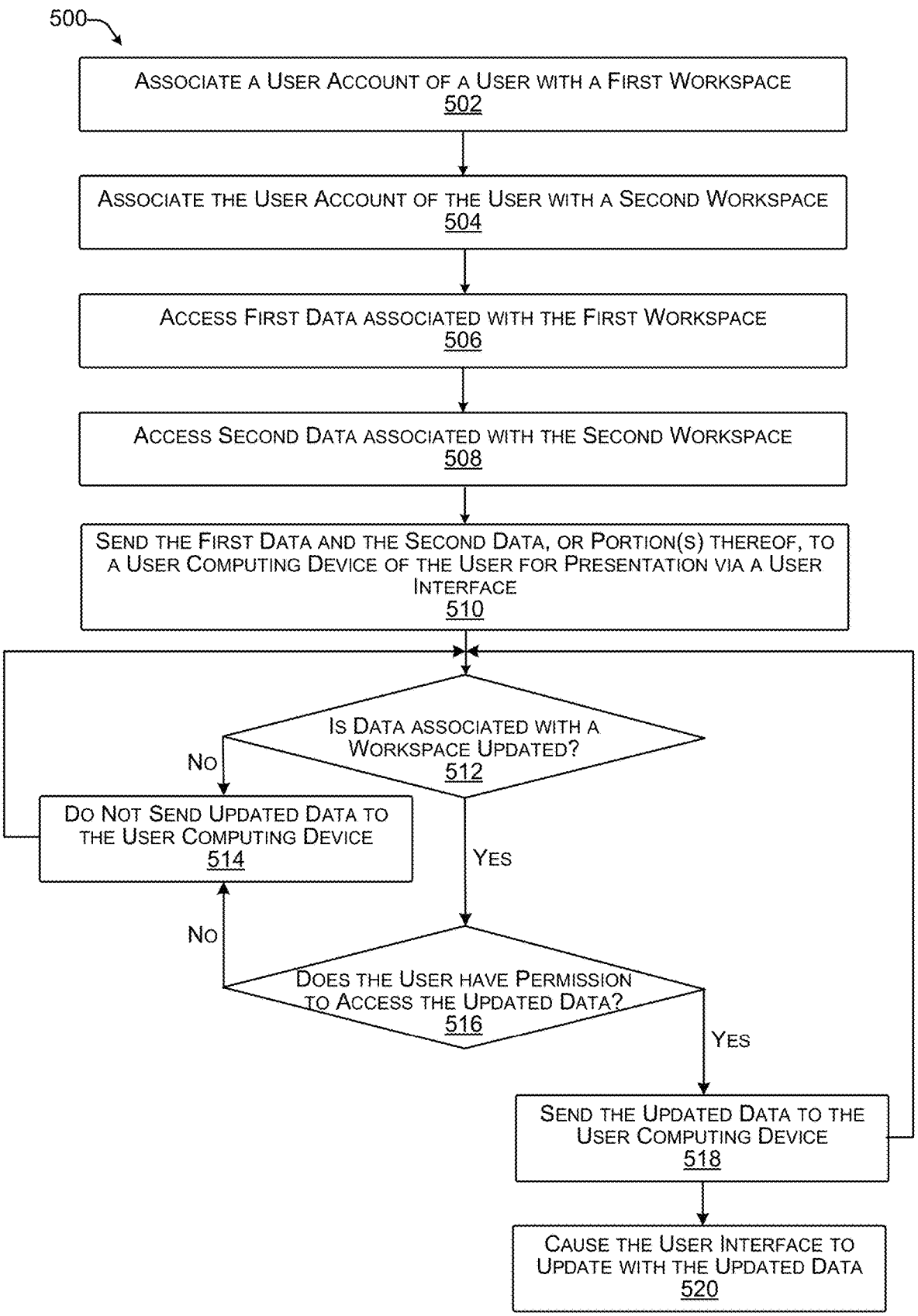
FIG. 5 illustrates an example process for presenting and/or updating data associated with a user interface that presents data associated with multiple workspaces, as described herein.

FIG. 5 illustrates an example process 500 for presenting and/or updating data associated with a user interface that presents data associated with multiple workspaces, as described herein. The example process 500 illustrates an example embodiment wherein the server(s) 102 push updated data to the user computing device 104, for example without the user computing device 104 requesting such data.

At operation 502, the workspace management component 116 can associate a user account of a user with a first workspace. As described above, the workspace management component 116 can manage workspace membership. That is, the workspace management component 116 can receive requests to associate users with individual workspaces and the workspace management component 116 can associate user accounts associated with such users with group identifiers associated with the individual workspaces. For example, the workspace management component 116 can associate a user account of a user with a first group identifier of a first workspace. In some examples, instead of, or in addition to associating a user account with a first group identifier, the workspace management component 116 can associate a first user identifier of a user with the first group identifier. Users associated with the first group (e.g., users associated with the first group identifier) can chat, meet, call, collaborate, transfer files or other data, or otherwise communicate between or among each other in a secure and private virtual space, which is the first workspace. By associating the user account with the first group identifier, the user account (and thus the user) can be associated with the first workspace and the user can chat, meet, call, collaborate, transfer files or other data, or otherwise communicate with other users in the first group. In some examples, such an association can enable the user to access communication channels associated with the first workspace and/or other data associated with the first workspace. In at least one example, such an association (e.g., between the user account and the first group identifier) can be stored in the user data 124 and/or the workspace data 128.

At operation 504, the workspace management component 116 can associate the user account of the user with a second workspace. In at least one example, the workspace management component 116 can associate the user account of a user with a second group identifier of a second workspace. In some examples, instead of, or in addition to associating the user account with a second group identifier, the workspace management component 116 can associate a second user identifier of the user with the second group identifier. In some examples, the user identifier can be the same as the first user identifier. In other examples, the user identifier can be a different user identifier than the second user identifier. Users associated with the second group (e.g., users associated with the second group identifier) can chat, meet, call, collaborate, transfer files or other data, or otherwise communicate between or among each other in a secure and private virtual space, which is the second workspace. By associating the user account with the second group identifier, the user account (and thus the user) can be associated with the second workspace and the user can chat, meet, call, collaborate, transfer files or other data, or otherwise communicate with other users in the second group. In some examples, such an association can enable the user to access communication channels associated with the second workspace and/or other data associated with the second workspace. In at least one example, such an association (e.g., between the user account and the second group identifier) can be stored in the user data 124 and/or the workspace data 128.

In some examples, the first group and the second group can be associated with a same organization. That is, the first group and the second group (e.g., members thereof) can be associated with a same organization identifier, and permissions, preferences, channels, emojis, etc. associated with such an organization can be applicable to the first group and the second group. In some examples, the first group and the second group can be associated with different organizations. That is, the first group (e.g., members thereof) and the second group (e.g., members thereof) can be associated with different organization identifiers. In some examples, members of the first group can be associated with a single organization and/or members of the second group can be associated with a single organization. In such examples, members of the first group can be associated with a same organization identifier and/or members of the second group can be associated with a same organization identifier. In some examples, members of the first group can be associated with two or more different organizations and/or members of the second group can be associated with two or more different organizations. In such examples, members of the first group can be associated with two or more different organization identifiers and/or members of the second group can be associated with two or more different organization identifiers.

At operation 506, the workspace management component 116 can access first data associated with the first workspace. As described above, the workspace data 128 can store data associated with individual workspaces. In at least one example, the first group identifier, which can be associated with the first workspace, can indicate a physical address in the workspace data 128 where first data related to the first workspace is stored. In at least one example, the first data can include data associated with permissions of the first workspace, data identifying users associated with the first workspace, data associated with messages and/or other content associated with the first workspace, data associated with communication channels associated with the first workspace, and the like. As described above, in some examples, such data can be mapped to, or otherwise associated with, other types of data in the datastore 122 (e.g., the user data 124, the permission data 126, the channel data 130, etc.). In at least one example, the workspace management component 116 can access the first data associated with the first group identifier.

At operation 508, the workspace management component 116 can access second data associated with the second workspace. In at least one example, the second group identifier, which can be associated with the second workspace, can indicate a physical address in the workspace data 128 where second data related to the second workspace is stored. In at least one example, the second data can include data associated with permissions of the second workspace, data identifying users associated with the second workspace, data associated with messages and/or other content associated with the second workspace, data associated with communication channels associated with the second workspace, and the like. As described above, in some examples, such data can be mapped to, or otherwise associated with, other types of data in the datastore 122 (e.g., the user data 124, the permission data 126, the channel data 130, etc.). In at least one example, the workspace management component 116 can access the second data associated with the second group identifier.

At operation 510, the workspace management component 116 can send the first data and the second data, or portion(s) thereof, to a user computing device of the user for presentation via a user interface. In at least one example, the workspace management component 116 can send the first data and the second data, or portion(s) thereof, to a user computing device 104 of the user. In some examples, the first data can be sent at the same time as the second data. In some examples, the first data and the second data can be sent separately.

In some examples, the workspace management component 116 can access the permission data 126 to determine and/or confirm that the user has permission to access the first data and the second data. If the user does not have permission to access a portion of the first data and/or a portion of the second data (e.g., the portion(s) are associated with private communication channels, or are otherwise restricted to the user), the workspace management component 116 can refrain from sending such portion(s) of the data to the user computing device 104. In some examples, if a user is not a member of a particular communication channel associated with the first workspace or the second workspace, the workspace management component 116 may refrain from sending data associated with the particular communication channel to the user computing device 104 (e.g., in an effort to conserve resources and network bandwidth). That is, in some examples, the workspace management component 116 can send all of the first data and the second data to the user computing device 104 and, in other examples, the workspace management component 116 can send a portion of the first data and/or a portion of the second data, based at least in part on permissions and user subscriptions (e.g., to particular communication channels).

In at least one example, the application 140 associated with the user computing device 104 can receive the first data and the second data, or the portion(s) thereof, and can present the received data via a user interface. In at least one example, the application 140 can integrate the first data and the second data, or the portion(s) thereof, into a single user interface that can present data associated with multiple different workspaces. An example user interface 144 is provided above with reference to FIGS. 1-4. In at least one example, the user interface can be accessible via each workspace the user is associated with (e.g., at least the first workspace and the second workspace).

At operation 512, the workspace management component 116 can determine whether the data associated with a workspace (e.g., the first workspace and/or the second workspace) has been updated. In at least one example, the workspace management component 116 can manage cross-workspace data integration, as described herein. For example, the workspace management component 116 can detect updates to data associated with a workspace and can integrate such updated data into the user interface(s) presented via user computing device(s) of user(s) associated with the workspace.

In at least one example, the workspace management component 116 can access the workspace data 128 to determine whether either the first data associated with the first workspace or the second data associated with the second workspace has been updated. In some examples, the workspace management component 116 can determine whether either the first data associated with the first workspace or the second data associated with the second workspace has been updated at a particular frequency, after a lapse of a period of time, or the like. In some examples, the workspace management component 116 can compare versions of the workspace data 128 to detect updates. In some examples, the workspace management component 116 can detect updates to data as such updates are received. That is, in some examples, the workspace management component 116 can determine that data associated with a workspace has been updated in real time or near-real time. In some examples, indications that a workspace has been updated can be received from the channel management component 118, which can detect an update to data associated with a communication channel and can send an indication of such an update to the workspace management component 116.

If neither workspace is associated with updated data, the workspace management component 116 can refrain from sending updated data to the user device, as illustrated at operation 514. The process 500 can return to operation 512 to determine whether data associated with either workspace has been updated.

If data associated with at least one of the first workspace or the second workspace is updated, the workspace management component 116 can determine whether the user is permitted to access the updated data, as illustrated at operation 516. In at least one example, the workspace management component 116 can access the permission data 126 to determine whether the user is permitted to access the updated data. That is, the workspace management component 116 can analyze the permission data 126 to determine (i) whether the user is associated with the workspace (e.g., is a user account of the user associated with the group identifier) and (ii) whether the user is permitted to access a communication channel and/or virtual space with which the updated data is associated. In some examples, a user can be permitted to access a communication channel and/or virtual space based on the user being a member of the communication channel and/or virtual space (e.g., a user account of the user is associated with a channel identifier of the communication channel) or based on the user being temporarily subscribed to the communication channel and/or virtual space (e.g., a user account of the user is temporarily associated with a channel identifier of the communication channel), for example, while the user is previewing the communication channel and/or virtual space. If the user does not have permission to access the updated data, the process 500 can refrain from sending updated data to the user device, as illustrated at operation 514.

At operation 518, the workspace management component 116 can send updated data to the user computing device 104. In at least one example, if the workspace management component 116 detects that the first data and/or the second data has been updated, and the user has permission to access the updated data, the workspace management component 116 can send the updated data to the user computing device 104. In at least one example, the process 500 can return to operation 512 to determine whether data associated with either workspace has been updated.

At operation 520, the workspace management component 116 can cause the user interface to update with the updated data. In at least one example, the application 140 can receive the updated data and can update the user interface to include the updated data. In some examples, the updated data can be associated with embedded data (e.g., a channel identifier, a user identifier, content associated with the updated data (e.g., an emoji, etc.), or the like) and the application 140 can resolve the embedded data and update the user interface based at least in part on resolving such embedded data. In some examples, such resolution can be performed in real time or near-real time such that elements associated with updated data can be loaded on-demand. In at least one example, the updated data can be associated with an indication (e.g., a user interface element or object) indicating which workspace the updated data is associated with. In some examples, as described above, such an indication may not be presented if the updated data is associated with a same workspace that the user is currently interacting with and/or most recently interacted with.

Figure 6:
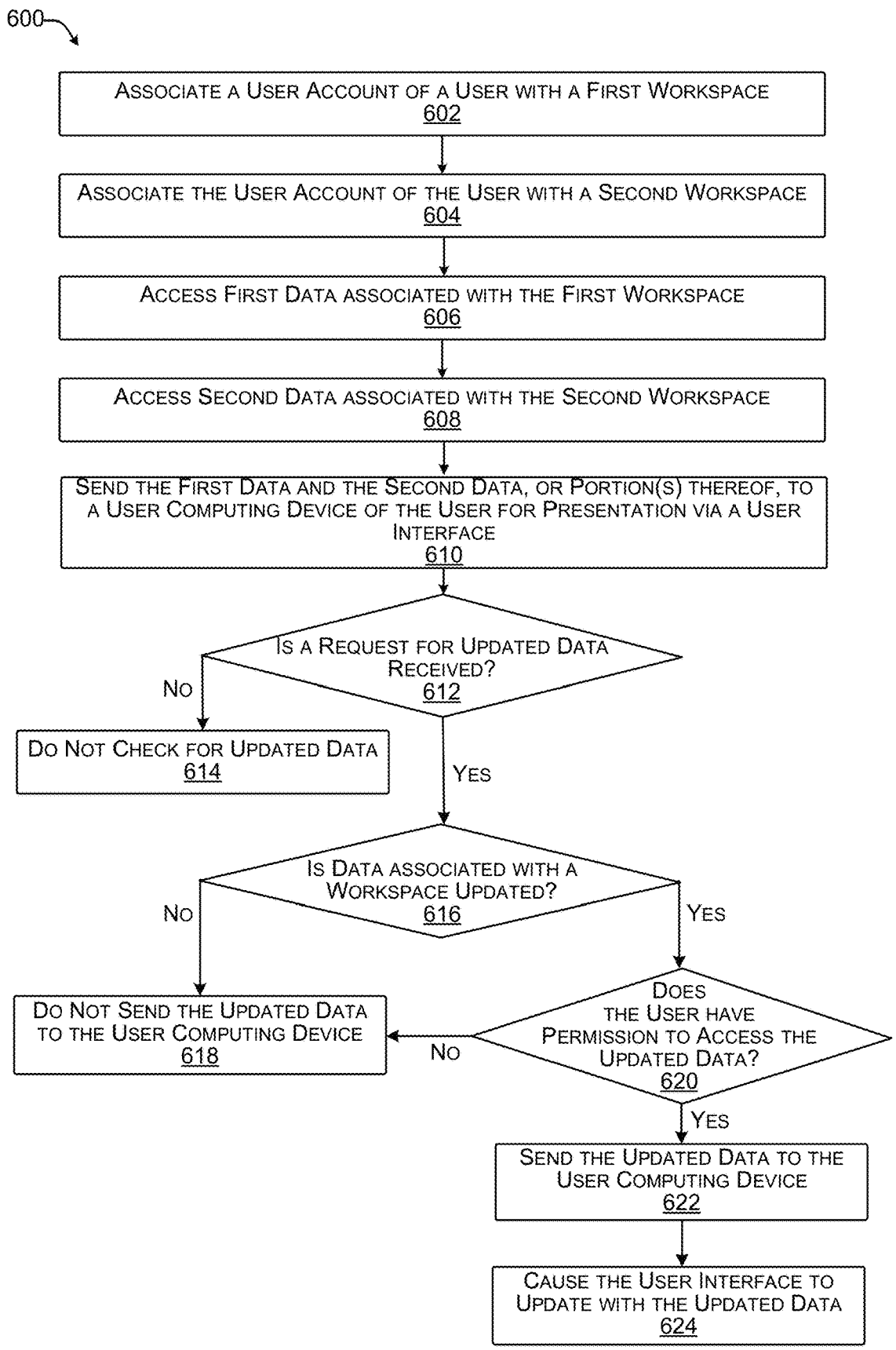
FIG. 6 illustrates another example process for presenting and/or updating data associated with a user interface that presents data associated with multiple workspaces, as described herein.

FIG. 6 illustrates another example process 600 for presenting and/or updating data associated with a user interface that presents data associated with multiple workspaces, as described herein. The example process 600 illustrates an example embodiment wherein the server(s) 102 send updated data to the user computing device 104 responsive to receiving a request for such data, for example if the user computing device 104 polls for such data or in association with a user input (e.g., to access unread messages, unread threads, unread mentions and reactions, and the like).

At operation 602, the workspace management component 116 can associate a user account of a user with a first workspace, as described above with reference to operation 502.

At operation 604, the workspace management component 116 can associate the user account of the user with a second workspace, as described above with reference to operation 504.

At operation 606, the workspace management component 116 can access first data associated with the first workspace, as described above with reference to operation 506.

At operation 608, the workspace management component 116 can access second data associated with the second workspace, as described above with reference to operation 508.

At operation 610, the workspace management component 116 can send the first data and the second data, or portion(s) thereof, to a user computing device of the user for presentation via a user interface, as described above with reference to operation 510.

At operation 612, the workspace management component 116 can determine whether a request for updated data is received. In some examples, the application 140 can send a request for updated data to the server(s) 102. In some examples, the application 140 can send such a request at a particular frequency, after a lapse of a period of time, or the like. That is, in some examples, the application 140 can poll the server(s) 102 to determine whether updated data has been received. In some examples, the application 140 can send such a request responsive to detecting an interaction between the user and the user interface. For example, the user can request to view data associated with a particular virtual space that is associated with multiple workspaces. In such an example, the application 140 can send a request prior to presenting data associated with the requested virtual space via the user interface.

If no request is received, the workspace management component 116 can refrain from checking workspace(s) for updated data, as illustrated at operation 614.

At operation 616, the workspace management component 116 can determine whether data associated with a workspace is updated, as described above with reference to operation 512. That is, in at least one example, based at least in part on receiving the request, the workspace management component 116 can determine whether first data associated with the first workspace and/or second data associated with the second workspace have been updated.

If neither workspace is associated with updated data, the workspace management component 116 can refrain from sending updated data to the user device, as illustrated at operation 618, and as described above with reference to operation 514.

If data associated with at least one of the first workspace or the second workspace is updated, the workspace management component 116 can determine whether the user has permission to access the updated data, as illustrated at operation 622, and described above with reference to operation 516.

At operation 620, the workspace management component 116 can send updated data to the user device, as described above with reference to operation 518, and can cause the user interface to update with the updated data, as illustrated at operation 622, as described above with reference to operation 520.

Figure 7:
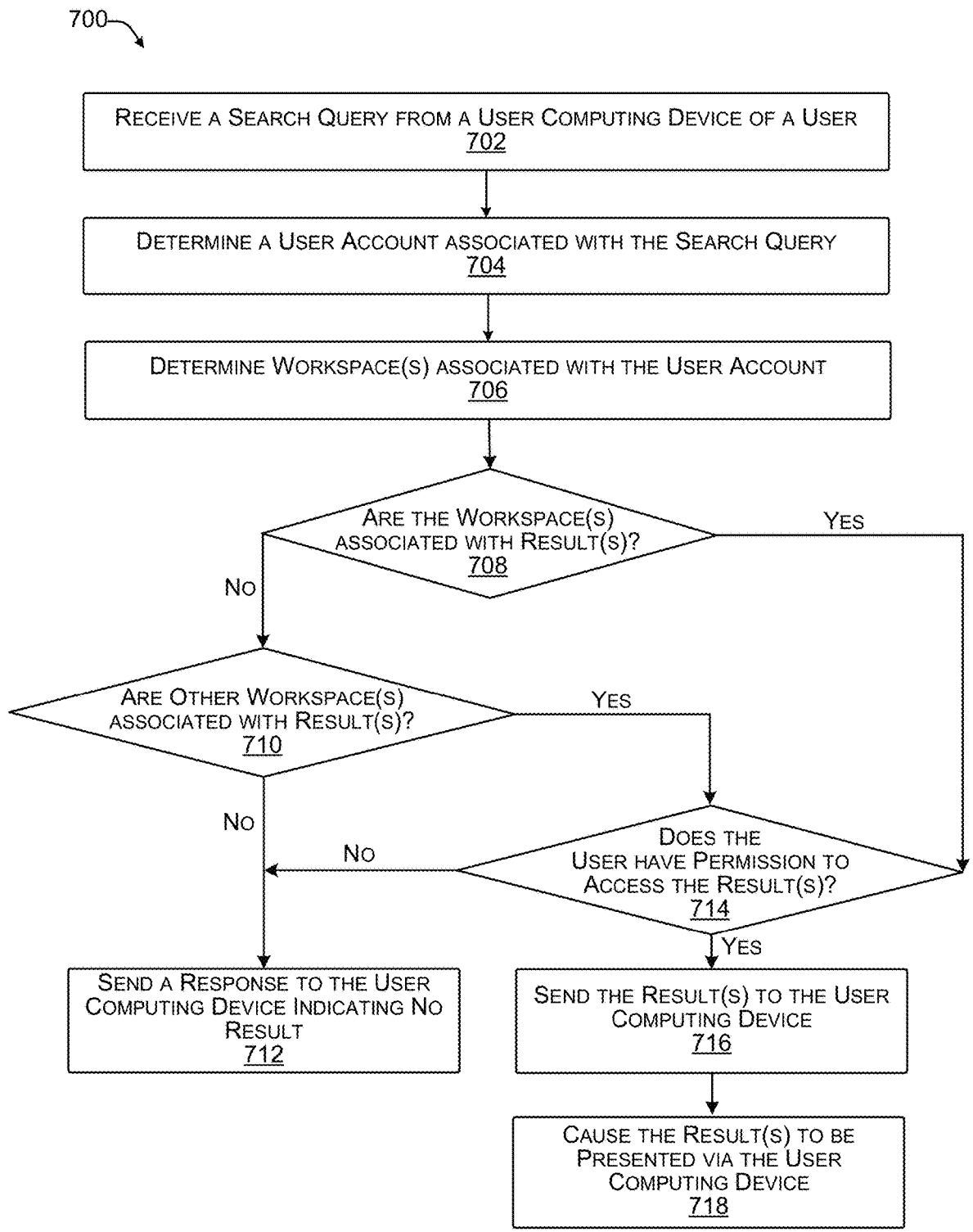
FIG. 7 illustrates an example process for facilitating a search associated with multiple workspaces, as described herein.

FIG. 7 illustrates an example process 700 for facilitating a search associated with multiple workspaces, as described herein.

At operation 702, the workspace management component 116 can receive a search query from a user device of a user. In at least one example, a user interface can include a search mechanism, wherein a user can input a search term (e.g., a query) associated with a communication platform. In some examples, the query can be associated with a communication channel, a file, a user, a term, a saved item, a message, a draft of a message, an application, or the like. In some examples, the query can be associated with a new message or a draft of a message. For example, the user can input a query to identify a recipient or a file to attach to a message. In such examples, the search mechanism can be within a message instead of within the user interface. Additionally or alternatively, the search mechanism can be an incremental search mechanism (e.g., real time suggestion engine) integrated into various functionalities within the application 140 such that as the user provides the input, the application 140 can progressively send the input to the server(s) 102 (and progressively receive results).

At operation 704, the workspace management component 116 can determine a user account associated with the search query. In at least one example, the search query can be associated with a user account (and/or a user identifier associated with the user account) of the user. In at least one example, the workspace management component 116 can analyze the search query (e.g., metadata associated therewith) to determine the user account of the user.

At operation 706, the workspace management component 116 can determine workspace(s) associated with the user account. In at least one example, the workspace management component 116 can access the user data 124 and/or the workspace data 128 to determine which workspace(s) are associated with the user account. That is, the workspace management component 116 can determine which group identifiers the user account is associated with.

At operation 708, the workspace management component 116 can determine whether the workspace(s) are associated with results. In at least one example, the workspace management component 116 can receive the query and perform a search of data associated with the workspace(s) with which the user account is associated. In some examples, the query can be associated with one or more specified workspaces, which can be fewer than all of the workspaces with which the account is associated. In at least one example, the workspace management component 116 can access the workspace data 128 to determine whether the any of the workspace(s) with which the user is associated (and, in some examples, has specified as part of the search) correspond to the query.

At operation 710, the workspace management component 116 can determine whether other workspace(s) are associated with result(s). If none of the workspace(s) with which the user is associated (and/or has specified as part of the search) correspond to the query, in some examples, the workspace management component 116 can analyze data associated with other workspace(s) associated with the communication platform to determine whether such other workspace(s) are associated with result(s) to the query. In such an example, the user may not be associated with any of the other workspace(s). That is, the user account may not be associated with group identifier(s) associated with the other workspace(s).

If no workspace(s) are associated with the result, the workspace management component 116 can return a response to the user computing device indicating no result, as illustrated at operation 712.

At operation 714, the workspace management component 116 can determine whether the user has permission to access the result(s). In at least one example, if the workspace management component 116 determines that data associated with at least one workspace or other workspace is associated with a result to the query, the workspace management component 116 can access the permission data 126 to determine whether the user has permission to access data associated with the workspace(s) and/or other workspace(s). If the user does not have permission to access the result(s), the workspace management component 116 can return a response to the user computing device indicating no result, as illustrated at operation 712.

At operation 716, the workspace management component 116 can send the result(s) to the user computing device 104. In at least one example, if the permission data 126 indicates that the user has permission to access the workspace(s) and/or other workspace(s) associated with the result(s), the workspace management component 116 can send the result(s) to the user computing device 104, and the application 140 can cause the result(s) to be presented via a user interface, as illustrated at operation 718.

As described above, techniques described herein enable users to access data associated with multiple workspaces via interactions with a user interface. In some examples, a user can request to search for a communication channel, a file, a user, a term, a saved item, a message, a draft of a message, an application, or the like, and the workspace management component 116 can perform a search of any/all of the workspace(s) with which the user is associated and/or has otherwise specified as a parameter of the search. In some examples, as described above, the workspace management component 116 can extend the search beyond workspace(s) associated with the user.

Figure 8:
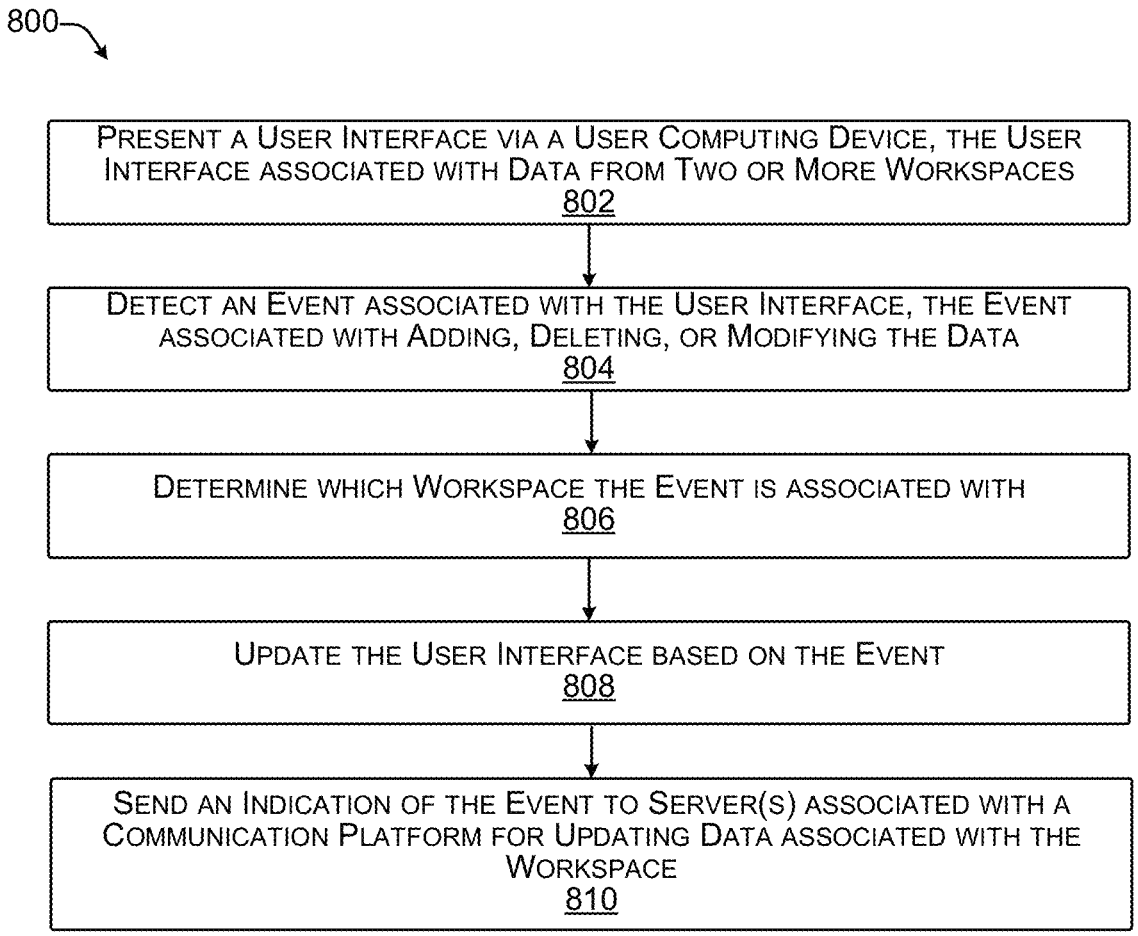
FIG. 8 illustrates an example process for updating a user interface that presents data associated with multiple workspaces based at least in part on an event associated with the user interface, as described herein.

FIG. 8 illustrates an example process 800 for updating a user interface that presents data associated with multiple workspaces based at least in part on an event associated with the user interface, as described herein.

At operation 802, the application 140 can present a user interface via a user computing device, wherein the user interface is associated with data from two or more workspaces. As described above, the user computing device 104 can be associated with the application 140 that can facilitate the exchange of data between and among various other user computing devices, for example via the server(s) 102. In at least one example, the application 140 can present user interfaces, as described herein. In at least one example, the application 140 can receive data from the workspace management component 116, which can include data from two or more workspaces. In at least one example, the application 140 can receive the data and can present the data via a user interface. That is, the user interface can present data associated with two or more workspaces. In some examples, the application 140 can receive instructions for how to generate the user interface and/or how the data is to be presented via the user interface from the workspace management component 116, for example, in association with the data. In other examples, the application 140 can generate and/or determine how to present the data via the user interface (e.g., without an instruction from the workspace management component 116). A non-limiting example of such a user interface, the user interface 144, is described above with reference to FIGS. 1-4.

At operation 804, the application 140 can detect an event associated with the user interface, wherein the event is associated with adding, deleting, or modifying the data. In at least one example, a user can interact with the user interface via touch input, keyboard input, mouse input, spoken input, or any other type of input. In at least one example, the application 140 can detect an input associated with an interaction with the user interface. Such an input can correspond to an "event." In some examples, the user can interact with the user interface to post a message to a communication channel, post a comment in a thread associated with a message in a communication channel, mention a user associated with a communication channel, add a reaction associated with a message in a communication channel, draft a message to be posted in a communication channel, upload a file to a communication channel, save an item to a communication channel, or the like. In some examples, the user can interact with the user interface to delete a message, a comment, or the like. In some examples, the user can interact with the user interface to add, delete, or modify membership of a communication channel, a workspace, or the like, details associated with a communication channel, a workspace, or the like, a property of a communication channel, a workspace, or the like, etc.

At operation 806, the application 140 can determine which workspace (of the two or more workspaces) the event is associated with. As described above, a user can be associated with multiple workspaces and the user interface can present data associated with multiple workspaces. That is, the user interface can enable the user to interact with data associated with the multiple workspaces with which he or she is associated. In at least one example, based at least in part on detecting the event, as described above, the application 140 can determine which workspace the event is associated with. That is, the application 140 can determine which workspace the user is interacting with when the event is detected.

At operation 808, the application 140 can update the user interface based on the event. In some examples, the application 140 can update the user interface and send an indication an indication of the event to the sever(s) 102 associated with a communication platform for updating data associated with the workspace, as illustrated at operation 810. In some examples, the application 140 can send an indication an indication of the event to the sever(s) 102 associated for updating data associated with the workspace, and can receive instructions from the server(s) 102 for updating the user interface. That is, in some examples, the application 140 can update the user interface based on an instruction received from the server(s) 102 (e.g., the workspace management component 116).

In at least one example, the indication of the event sent from the application 140 to the server(s) 102 can be associated with an indication of which workspace the event was associated with. As such, the workspace management component 116 can receive the indication of the event and update data associated with the event in the workspace data 128 (and/or channel data 130, if applicable). Such updates can then be sent to other user computing device(s) associated with other user(s) that are associated with the updated workspace (e.g., via a push from the server(s) 102 or responsive to a request from the other user computing device(s)).

Figure 9:
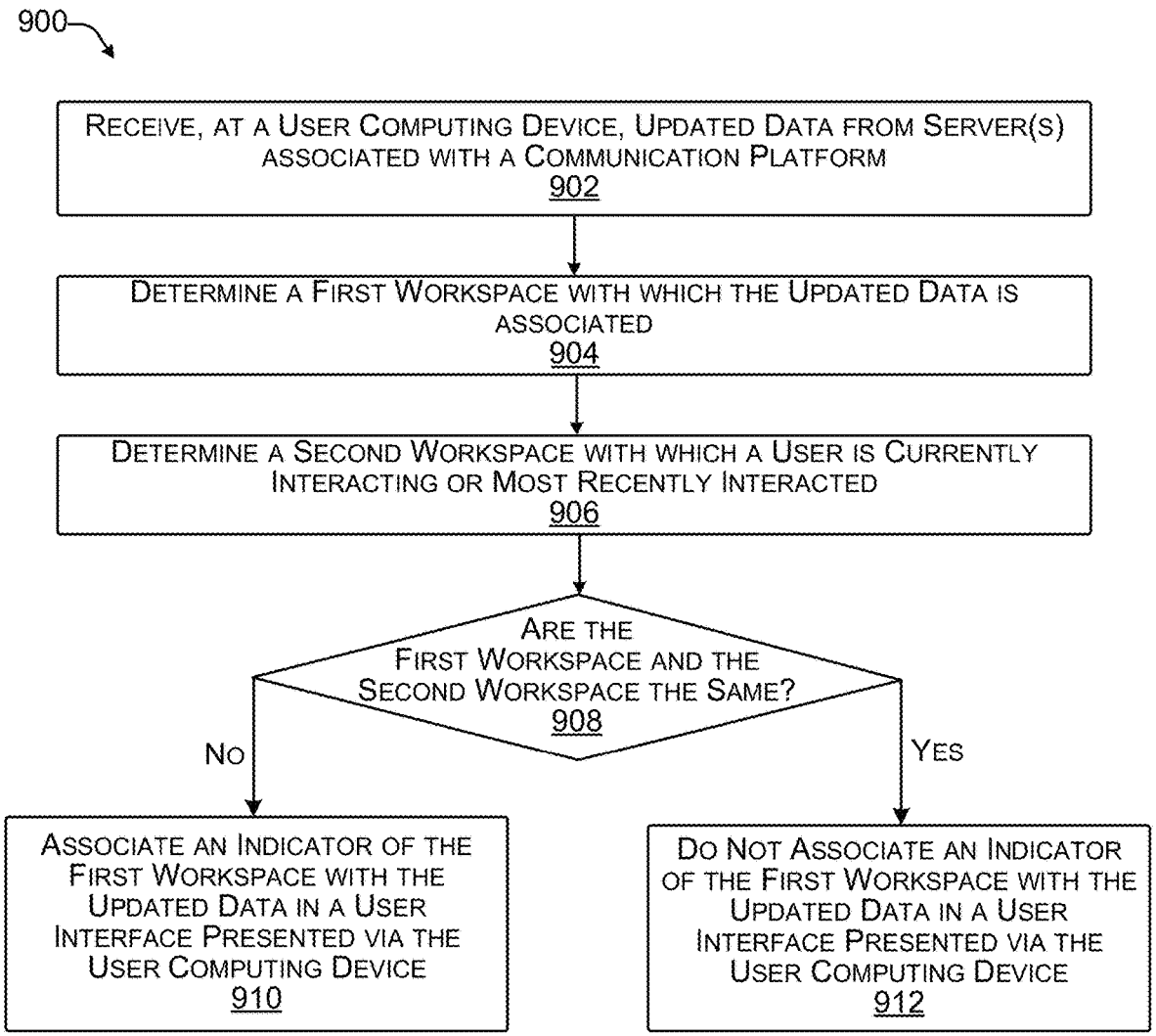
FIG. 9 illustrates an example process for presenting updated data via a user interface that presents data associated with multiple workspaces, as described herein.

FIG. 9 illustrates an example process 900 for presenting updated data via a user interface that presents data associated with multiple workspaces, as described herein.

At operation 902, the application 140 can receive updated data from server(s) associated with a communication platform (e.g., the server(s) 102). As described above, with reference to FIGS. 5 and 6, the server(s) 102 can send updated data to the application 140, via a push from the server(s) 102 or responsive to a request from the user computing device 104. In at least one example, the application 140 can receive the updated data and can present the updated data via a user interface, as described above. In some examples, the updated data can be associated with embedded data (e.g., a channel identifier, a user identifier, content associated with the updated data (e.g., an emoji, etc.), or the like) and the application 140 can resolve the embedded data and update the user interface based at least in part on resolving such embedded data. In some examples, such resolution can be performed in real time or near-real time such that elements associated with updated data can be loaded on-demand.

At operation 904, the application 140 can determine a first workspace with which the updated data is associated. In at least one example, the updated data can be associated with an indication of which workspace the updated data is associated with. The application 140 can determine that the updated data is associated with a first workspace based at least in part on such an indication.

At operation 906, the application 140 can determine a second workspace with which a user is currently interacting and/or most recently interacted. As described above, a user can be associated with multiple workspaces. In at least one example, the application 140 can determine a second workspace with which the user is currently interacting and/or most recently interacted.

At operation 908, the application 140 can determine whether the first workspace and the second workspace are the same. In at least one example, the application 140 can determine whether the first workspace and the second workspace are the same workspace. That is, the application 140 can determine whether the updated data is associated with the same workspace with which the user is currently interacting and/or most recently interacted, or a different workspace. If the first workspace and the second workspace are not the same, the application 140 can associate an indicator of the first workspace with the updated data in the user interface presented via the user computing device 104, as illustrated at operation 910. If the first workspace and the second workspace are the same, the application 140 can refrain from associating an indicator of the first workspace with the updated data in a user interface presented via the user computing device 104, as illustrated at operation 912. That is, in some examples, the application 140 can cause an indicator to be presented to indicate which workspace the updated data is associated with to provide a visual distinction within the user interface.

As described above, workspaces are often associated with groups of users that have particular permissions and as such, in existing techniques, users associated with multiple workspaces are not able to access data associated with the multiple workspaces without logging in to each workspace individually. That is, in existing techniques, for a user to access data associated with a workspace, the user must log in to that workspace. In existing techniques, if a user is logged into a first workspace and receives a message in a second workspace, the user will not know of the message until the user logs out of the first workspace and into the second workspace. That is, in existing techniques, even though a user can be using a same communication platform the user may not be aware of events that affect the user that are occurring in workspaces of which the user is not logged in. This can be frustrating for users and can cause a fractured user experience. Further, in existing techniques, for the user to access data associated with another workspace, the user may need to interact with a user computing device multiple times to log out of a current workspace and into another workspace. Not only is this time consuming, such existing techniques are computationally expensive and inefficient. As described above with reference to FIGS. 1-9, techniques described herein provide solutions to shortcomings in existing techniques. That is, techniques described herein, enable users to access data associated with multiple workspaces, interact with such data, and/or otherwise communicate with other users associated with the multiple workspaces via streamlined, more user-friendly user interfaces and operations (e.g., without consuming network resources associated with logging in and logging out of different workspaces). As such, techniques described herein offer improvements to existing technological processes and provide better user experiences for users of communication platforms, such as those described herein.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method, implemented at least in part by one or more computing devices of a group-based communication platform, comprising:
    associating a first communication channel with a first group identifier corresponding to a first workspace of the group-based communication platform and a second group identifier corresponding to a second workspace of the group-based communication platform;
    associating the first communication channel with a first organization identifier associated with a first organization and a second organization identifier associated with a second organization;
    causing display of a first user interface in the first workspace, wherein the first user interface comprises the first communication channel and a second communication channel and the first communication channel is associated with a first graphical element indicating that the first communication channel is associated with one or more workspaces and a second graphical element indicating that the first communication channel is associated with two or more organizations;
    receiving, from the first workspace, a first event occurring in the first communication channel;
    causing display of a first notification associated with the first communication channel in the first user interface of the first workspace;
    receiving, from the first workspace, a second event occurring in the second communication channel;
    causing display of a second notification associated with the second communication channel in the first user interface of the first workspace;
    detecting a user selection of the second workspace; and
    causing display of a second user interface associated with the second workspace in the group-based communication platform, wherein the second user interface comprises the first communication channel and not the second communication channel and wherein the first notification associated with the first communication channel is displayed.

2. The method as claim 1 recites, further comprising:
    receiving, via an input associated with the first workspace, a request to present the first user interface; and
    causing the first user interface to be presented in association with the first workspace.

3. The method as claim 1 recites, wherein based at least in part on associations of the first group identifier, the second group identifier, the first organization identifier, and the second organization identifier with the first communication channel, users associated with the first workspace, the second workspace, the first organization, and the second organization are permitted to perform one or more actions in association with the first communication channel, wherein at least one of the first event or the second event comprises an action of the one or more actions.

4. The method as claim 1 recites, wherein data associated with the first communication channel is not visible via a third workspace that is not associated with the first communication channel.

5. The method as claim 1 recites, further comprising causing a feed to be presented via the first user interface, wherein the feed is associated with at least the first event and the second event, and wherein the first event is associated with a third graphical element indicating a first group with which a first user that performed the first event is associated and the second event is associated with a fourth graphical element indicating a second group with which a second user that performed the second event is associated.

6. The method as claim 1 recites, wherein a first group communicates within the first workspace and a second group communicates with the second workspace.

7. The method as claim 1 recites, wherein the first event comprises at least one of adding, modifying, or deleting first data presented via the first communication channel and wherein the second event comprises at least one of adding, modifying, or deleting second data presented via the second communication channel.

8. The method as claim 1 recites, wherein the first event comprises user input to the first workspace.

9. A system comprising:
    one or more processors; and
    one or more non-transitory computer-readable media storing instructions that, when executed by the one or more processors, cause the system to perform operations comprising:
        associating a first communication channel with a first group identifier corresponding to a first workspace of a group-based communication platform and a second group identifier corresponding to a second workspace of the group-based communication platform;
        associating the first communication channel with a first organization identifier associated with a first organization and a second organization identifier associated with a second organization;
        causing display of a first user interface in the first workspace, wherein the first user interface comprises the first communication channel and a second communication channel and the first communication channel is associated with a first graphical element indicating that the first communication channel is associated with one or more workspaces and a second graphical element indicating that the first communication channel is associated with two or more organizations;
        receiving, from the first workspace, a first event occurring in the first communication channel;
        causing display of a first notification associated with the first communication channel in the first user interface of the first workspace;
        receiving, from the first workspace, a second event occurring in the second communication channel;

causing display of a second notification associated with the second communication channel in the first user interface of the first workspace;

detecting a user selection of the second workspace; and causing display of a second user interface associated with the second workspace in the group-based communication platform, wherein the second user interface comprises the first communication channel and not the second communication channel and wherein the first notification associated with the first communication channel is displayed.

10. The system as claim 9 recites, wherein the first organization is different than the second organization.

11. The system as claim 9 recites, the operations further comprising:
receiving, via an input associated with the first workspace, a request to present the first user interface, wherein causing display of the first user interface is responsive to the input.

12. The system as claim 9 recites, wherein based at least in part on associations of the first group identifier, the second group identifier, the first organization identifier, and the second organization identifier with the first communication channel, users associated with the first workspace, the second workspace, the first organization, and the second organization are permitted to perform one or more actions in association with the first communication channel, wherein at least one of the first event or the second event comprises an action of the one or more actions.

13. The system as claim 9 recites, wherein data associated with the first communication channel is not visible via a third workspace that is not associated with the first communication channel.

14. The system as claim 9 recites, further comprising causing a feed to be presented via the first user interface, wherein the feed is associated with at least the first event and the second event, and wherein the first event is associated with a third graphical element indicating a first group with which a first user that performed the first event is associated and the second event is associated with a fourth graphical element indicating a second group with which a second user that performed the second event is associated.

15. The system as claim 9 recites, wherein the first event comprises at least one of adding, modifying, or deleting first data presented via the first communication channel and wherein the second event comprises at least one of adding, modifying, or deleting second data presented via the second communication channel.

16. One or more non-transitory computer-readable media storing instructions that, when executed by one or more processors, cause the one or more processors to perform operations comprising:
associating a first communication channel with a first group identifier corresponding to a first workspace of a group-based communication platform and a second group identifier corresponding to a second workspace of the group-based communication platform;

associating the first communication channel with a first organization identifier associated with a first organization and a second organization identifier associated with a second organization;

causing display of a first user interface in the first workspace, wherein the first user interface comprises the first communication channel and a second communication channel and the first communication channel is associated with a first graphical element indicating that the first communication channel is associated with one or more workspaces and a second graphical element indicating that the first communication channel is associated with two or more organizations;

receiving, from the first workspace, a first event occurring in the first communication channel;

causing display of a first notification associated with the first communication channel in the first user interface of the first workspace;

receiving, from the first workspace, a second event occurring in the second communication channel;

causing display of a second notification associated with the second communication channel in the first user interface of the first workspace;

detecting a user selection of the second workspace; and causing display of a second user interface associated with the second workspace in the group-based communication platform, wherein the second user interface comprises the first communication channel and not the second communication channel and wherein the first notification associated with the first communication channel is displayed.

17. The one or more non-transitory computer-readable media as claim 16 recites, the operations further comprising:
receiving, via an input associated with the first workspace, a request to present the first user interface; and
causing the first user interface to be presented in association with the first workspace.

18. The one or more non-transitory computer-readable media as claim 16 recites,
wherein data associated with the first communication channel is not visible via a third workspace that is not associated with the first communication channel.

19. The one or more non-transitory computer-readable media as claim 16 recites, wherein the first event comprises at least one of adding, modifying, or deleting first data presented via the first communication channel and wherein the second event comprises at least one of adding, modifying, or deleting second data presented via the second communication channel.

20. The one or more non-transitory computer-readable media as claim 16 recites, wherein the first event comprises user input to the first workspace.

* * * * *